Figure 3:
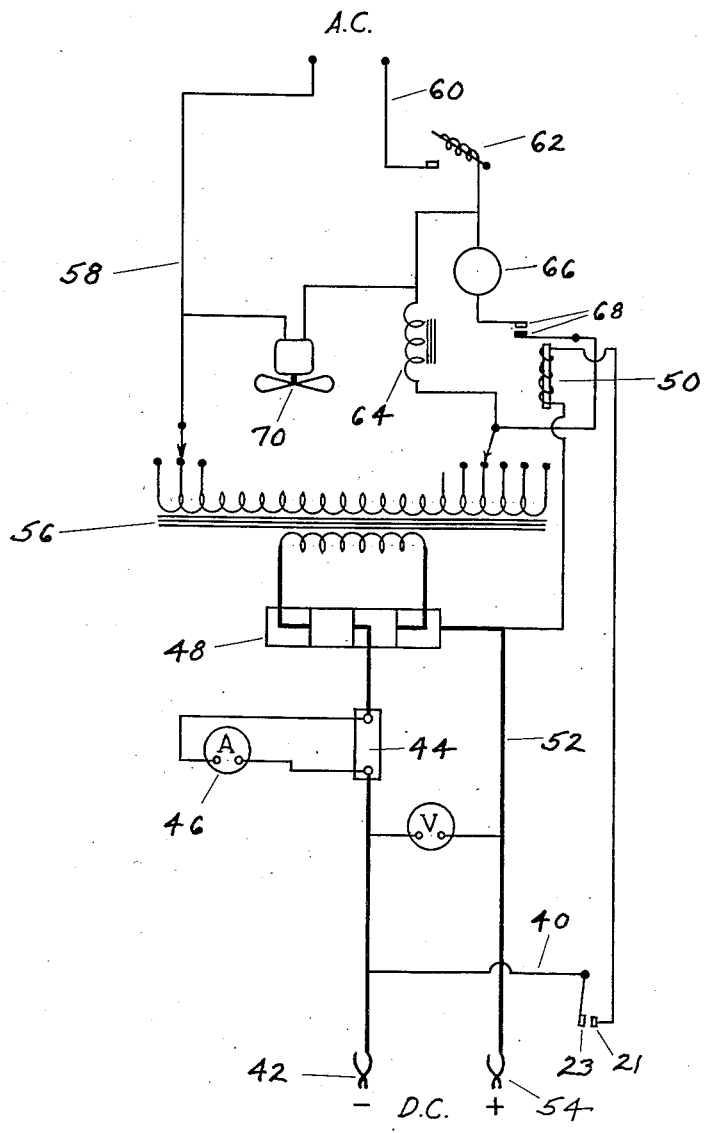

Oct. 30, 1951 C. E. PETERS 2,573,483
SWITCH FOR USE WITH BATTERY CHARGERS
Filed Oct. 14, 1946 2 SHEETS—SHEET 1
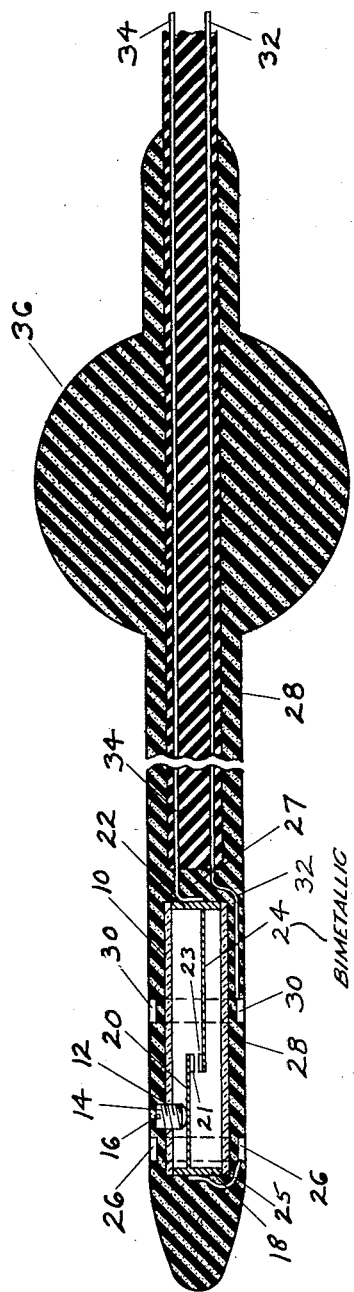
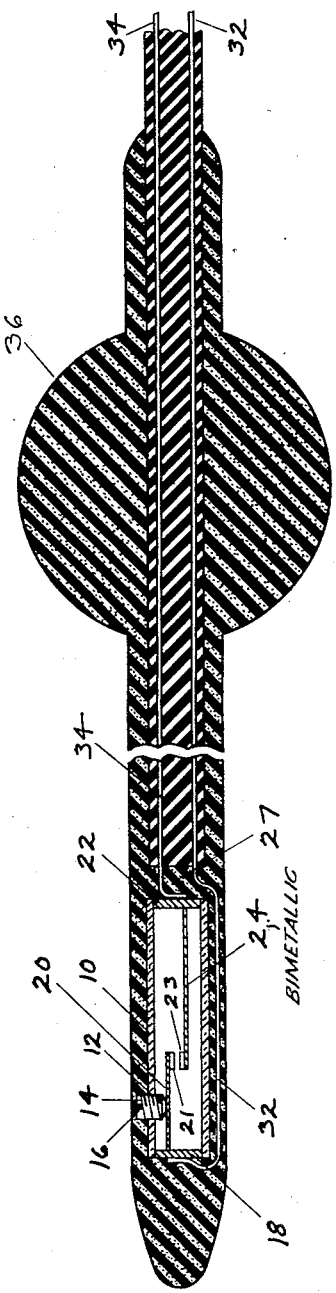
INVENTOR:
CARL E. PETERS
BY
Roy M. Eilers
ATTORNEYS.

Oct. 30, 1951     C. E. PETERS     2,573,483
SWITCH FOR USE WITH BATTERY CHARGERS
Filed Oct. 14, 1946     2 SHEETS—SHEET 2

INVENTOR:
CARL E. PETERS
BY
Roy M. Eilers
ATTORNEYS.

Patented Oct. 30, 1951

2,573,483

UNITED STATES PATENT OFFICE 2,573,483

SWITCH FOR USE WITH BATTERY CHARGERS

Carl E. Peters, University City, Mo., assignor, by mesne assignments, to Vickers, Incorporated, a corporation of Michigan Application October 14, 1946, Serial No. 703,238

16 Claims. (Cl. 200—138)

This invention relates to improvements in control circuits for electrical equipment. More particularly, this invention relates to improvements in thermostatic or thermally-responsive devices used in control circuits for electrical equipment.

It is, therefore, an object of the present invention to provide an improved thermostatic or thermally-responsive device that can be used in control circuits for electrical equipment.

In the past, high capacity battery chargers have been used to test the condition of the storage batteries carried by automotive vehicles, and thereafter have been used to charge those batteries until they are restored to a fully charged condition. To provide a full charge in a short time, as required by the demands of owners and operators of automobiles, the chargers must have a very high capacity, and this high capacity makes it necessary to provide a precise control over the duration of the charging operation, since the continuance of the charging operation, at the high rate beyond the time the battery is fully charged, might injure the battery. Accordingly, high capacity battery chargers have been provided with various elements and devices that are intended to keep the storage batteries from receiving the charge over a prolonged period of time. One of the devices which was used with high capacity battery chargers to regulate the charging time was a thermostat that could be inserted directly in the electrolyte of a storage battery and could be used to respond to the changes in the temperature of the electrolyte, consequent upon changes in the charge of the battery, to determine the duration of the charging operation. At the time the thermostatic device would be immersed in the electrolyte, the electrolyte would be cool enough to permit the thermostatic device to permit energization of the battery charger, and at the time the battery reached a fully charged condition, the electrolyte would be warm enough to cause the thermostatic device to disconnect the battery or discontinue the charge from the battery charger. The theory of operation of these thermostatic devices was good, but the devices themselves were very unsatisfactory because they did not respond fully and exclusively to the temperature of the electrolyte. For example, in some instances the thermostatic devices were incased in strong, acidproof metal jackets that rested on one of the threaded openings at the top of the battery and that had portions which extended directly down from those openings into the electrolyte above the battery plates. These jackets, which were believed to be desirable because they were strong, because they were made of heat-transferring material, and because they were proof against attack by electrolyte, were actually quite objectionable. For example, the requirement of strength resulted in the use of a mass of metal that was so great that the thermostatic device had to be completely immersed in the electrolyte of the battery, lest the heat supplied to the jacket, through a small area contacted by electrolyte or by means of the vapor from the electrolyte, be absorbed and conducted away so rapidly that the thermostatic device could not give a true indication of the temperature of the electrolyte. As a result, unless the battery had an ample supply of electrolyte, the thermostatic device could not provide a true indication of the temperature, and an ample supply of electrolyte is the exception rather than the rule with storage batteries brought in to be charged. It might seem feasible to add water to the battery to raise the level of the electrolyte above the tops of the battery plates and thus facilitate complete immersion of the jacket; but the addition of the water would change the specific gravity of the electrolyte and give a false indication of the specific gravity of the electrolyte. When water is added to a battery, the homogeneity of the electrolyte is disturbed; the electrolyte having an excess of water at the top and an excess of acid at the bottom thereof. After a time, the miscibility of the acid and water will enable the electrolyte to again become homogeneous. However, this requires some time; and any determination, made prior to the moment the electrolyte becomes homogeneous, will give misleading information. Accordingly, it is apparent that unless the supply of electrolyte is ample, the previously used thermostatic devices cannot provide a true indication of the temperature of the electrolyte and the condition of the battery. The requirement of strength for the jacket cooperates with the requirement that the jacket be acid-proof to additionally complicate the problem since the jacket will be large and will have a large surface that projects out beyond the opening in the top of the battery. This surface will, depending on its temperature, absorb or radiate heat and will make the thermostatic devices responsive to changes in the temperature of the air outside of the battery rather than changes in the temperature of the electrolyte in the battery. Moreover, the inflexible character of the jackets will position the thermally-sensitive portions of the devices directly beneath the openings in the tops of the battery, thus making it possible for the atmosphere outside of the battery to have a direct and immediate effect on those portions of the devices. As a result, the previously used thermostatic devices were in many cases almost completely responsive to ambient temperature conditions rather than the temperature of the electrolyte. This is particularly true where the ambient temperature conditions are in the neighborhood of one hundred (100) degrees Fahrenheit or in the neighborhood of zero (0) degrees Fahrenheit, and both of these temperatures are experienced within the geographical limits of the territory served by manufacturers of high capacity battery chargers. For these various reasons the previously used thermostatic devices of control circuits for high capacity battery chargers are objectionable. The present invention obviates these objections by providing a small thermally-responsive device that is bodily insertable into the battery through one of the openings in the top of the battery and can be moved away from that opening until it is completely enclosed by the battery. Such a device will have such a small mass that it will be able to respond to the heat in the electrolyte vapor or to the heat transmitted to it by electrolyte that contacts only a small part of the device. Moreover, the device can be moved away from the opening in the top of the battery and can thus be isolated effectively from the atmosphere surrounding the battery. With such a construction, the thermally-responsive device will respond solely to the temperature of the electrolyte and will thus be truly responsive to the temperature of the electrolyte and to the condition of the electrolyte indicated by the changes in the temperature of the electrolyte. It is, therefore, an object of the present invention to provide a small thermally-responsive device that is completely insertable into one of the openings in the top of a battery and is movable away from said opening unil it is completely enclosed by said battery.

The thermally-responsive device of the present invention is completely sheathed in a flexible tube of insulating material that is resistant to the electrolyte of the battery. Such a sheath for the thermally-responsive device permits the device to be set in the battery without having the electrolyte attack the thermally-responsive device. In addition, the sheath permits the thermally-responsive device to be made of considerably lighter construction than was deemed feasible heretofore since the resilient material of the sheath will absorb the force of any blows that may fall upon the sheath. This lighter construction permits even further reductions in the thermal mass of the device, thus increasing the sensitivity of the device to the heat of the electrolyte or its vapor. Moreover, the sheath will enable the thermally-responsive device to be truly responsive to the temperature of the electrolyte, because it will not conduct appreciable amounts of heat between the thermally-responsive device and the atmosphere external of the battery, and it will have such a small thermal capacity that it will not itself absorb and hold much heat. Accordingly, instead of conducting heat away from the thermally sensitive portions of the device, as did the heavy metal jackets of previous thermally-responsive devices, the present sheath permits heat from the electrolyte or vapor rising from the electrolyte to penetrate to the thermally sensitive portion of the device and act upon it. Moreover, by having the sheath of small diameter and of flexible material, it is possible to bend the sheath and force it along the top of the battery plate until the thermally-responsive device is in a position spaced from the opening in the top of the battery. Thus the thermally-responsive device will be completely surrounded by the electrolyte or the vapor from the electrolyte and will operate independently of the temperature of the atmosphere surrounding the battery. It is, therefore, an object of the present invention to provide a thermally-responsive device that is enclosed in a flexible, resilient housing of insulation material which has electrolyte resistance.

The thermally-responsive device of the present invention is further isolated from the atmosphere surrounding the battery by a rubber bulb that will seat in the opening of the battery through which the thermally-responsive device was inserted. This bulb will tend to prevent or hinder any inlet or outlet of air through that opening while the thermally-responsive device is measuring the temperature of the electrolyte. The bulb will not be held in position other than by friction and the force of gravity, and it will not create any hazard, even though the electrolyte experiences considerable liberation of gases, because the rubber bulb can rise upwardly and relieve any pressure in the battery. This rubber bulb also serves to prevent retraction of the thermally-responsive device and its flexible sheath into the recess that is provided in the housing of the battery charger for the conductors that connect the thermally-responsive device with the battery charger. It is, therefore, an object of the present invention to provide a sheathed thermally-responsive device which is provided with a rubber bulb adjacent the end thereof.

Other objects and advantages of the present invention should become apparent from an examination of the drawing and accompanying description.

In the drawing and accompanying description, two preferred embodiments of the invention are shown and described but it is to be understood that the drawing and accompanying description are for the purposes of illustration only and do not limit the invention and that the invention will be defined by the appended claims.

In the drawing,

Fig. 1 is a cross sectional side elevational view of a sheathed thermostatic device embodying the principles and teachings of the present invention, Fig. 2 is a cross sectional side elevational view of another sheathed thermostatic device, and Fig. 3 is a schematic diagram of the electrical circuit of a battery charger employing one or the other of the thermostatic devices of Figs. 1 and 2.

Referring to the drawing in detail, the numeral 10 denotes a generally cylindrical, hollow, open-ended tube of insulating material that is provided with a threaded opening 12 in one side thereof. Positioned in the threaded opening 12 in the side of tube 10 is a threaded plug or set-screw 14 which has a transversely extending slot 16 that will receive the blade of a screwdriver or similar instrument. This plug is movable relative to the tube 10, and the exact setting of the plug 14 relative to the tube 10 can be determined by use of a screwdriver. Positioned in the left hand end of the tube 10 is a metal plate 18 that closes the left hand end of the tube 10. The plate 18 has attached thereto, as by brazing, soldering or any other suitable methods, a cantilever contact support 20 that extends longitudinally of the interior of tube 10. Positioned in the other end of the tube 10 is a metal plate 22 that closes the right hand end of tube 10. The plate 22 has attached thereto, as by brazing, soldering, or any other suitable method, a thermally-responsive element 24, and the element 24 is positioned so it extends longitudinally of the interior of tube 10. Attached to the inwardly extending end of the support 20 is an arc-resistant contactor 21, and attached to the inwardly extending end of the thermally-responsive element 24 is an arc-resistant contactor 23; the cantilever contact support 20 and the thermally-responsive element 24 are dimensioned so that contactors 21 and 23 are in register with each other. The thermally-responsive element 24 will deform itself and bend whenever its temperature reaches a predetermined level, and the element 24 is so positioned in the tube 10 that when it is cool it will hold its contactor 23 away from the contactor 21 of cantilever contact support 20, and that when it is heated sufficiently the element 24 will move its contactor 23 into engagement with the contactor 21. The precise distance between the contactors 23 and 21, at the beginning of any charging cycle, will be determined by the setting of the plug 14, since the end of the plug 14 bears against the cantilever contact support 20 and forces that support toward the thermally-responsive element 24.

Secured to the exterior surface of the plate 18 is a conductor 25 which is also connected to a conductor 26 of annular shape that is spaced outwardly from the exterior of the tube 10. The conductor 26, as well as the tube 10, will be supported and held by the sheath 28, and the sheath 28 will space the conductor 26 from tube 10. The sheath 28 is preferably made of some insulating material that is flexible, resilient and resistant to the electrolyte. Natural rubber has been found to be very useful for this purpose, however, other materials that fit these requirements can be used. The sheath 28 may be made in the form of a hollow tube that has one end closed and has one end open and into which the tube 10 can be inserted; or it can be made up in sections that can be cemented or otherwise secured together; or it can be molded onto the tube 10. Secured to and supported by the sheath 28, but spaced from the annular contact 26, is a second annular contact 30. The contact 30, like the contact 26, is preferably made of a metal that is resistant to the action of the electrolyte and one such metal is lead. The annular contact 30 has attached thereto a flexible conductor 32 that is one of the two insulation-encased conductors that are connected to the battery charger. The other conductor is denoted by the numeral 34, and that conductor is attached and connected to the exterior of the metal plate 22. The hollow interior of the sheath 28 is preferably dimensioned so the sheath 28 can telescope over and snugly fit the insulation on conductors 32 and 34. Formed adjacent the end of the sheath 28, and constituting part thereof, is a generally spherical bulb of insulating material that is preferably rubber. Formed at the other end of the sheath 28 is a smoothly-rounded end that has a streamlined shape, and when this smoothly-rounded end is inserted into the battery, it will not stick or be stopped by any of the elements in the battery, but instead will slide smoothly along the tops of the battery plates.

Fig. 2 shows a thermally-responsive device that is very similar to the device of Fig. 1; the principal difference between these two thermally-responsive devices is that in the device of Fig. 2 the conductor 32 passes directly to the metal plate 18 at the left hand end of the tube 10 and does not terminate in an annular contact ring. As a result, the annular contact rings 26 and 30 of Fig. 1 have been dispensed with in the device of Fig. 2. In all other respects, however, the two thermally-responsive devices are identical.

As indicated before, the sheath 28 can be in the form of a hollow tube with a closed end, and the tube 10 can be inserted through the open end of the sheath. The section of material, indicated by the numeral 27, could be a washer which could be telescoped over the insulated wires 34 and 32, and could then be telescoped into the sheath 28. In the case of Fig. 1, the external surface of the sheath 28 would have to be provided with two spaced recesses of annular shape that would receive the annular contacts 26 and 30 and the conductor 25 and the bent end of the conductor 32 would have to be embedded in the wall of the sheath 28. In the case of Fig. 2, the interior of the sheath 28 would have to be formed so it could receive the bent portion of the conductor 32. The sheaths of both Figs. 1 and 2 are dimensioned so their diameters are less than the diameters of the openings in the tops of storage batteries for automobiles. As a result, the sheaths 28 can carry the thermally-responsive tubes 10 into the interiors of the storage batteries.

In the schematic circuit diagram of Fig. 3, the contactors 21 and 23 of the thermally-responsive devices of Figs. 1 and 2 are shown and these contactors are connected to the battery charger shown in Fig. 3. Specifically, contactor 23 is connected to D. C. lead 40, and that lead is connected to the negative terminal of a battery by battery clip 42. The lead 40 is also connected through ammeter shunt 44 and ammeter 46 to one of the contacts of rectifier 48. Contactor 21 is connected through the solenoid coil of relay 50 to the D. C. lead 52 that is connected to the positive terminal of the battery by battery clip 54. The lead 52 is also connected to the rectifier 48. The rectifier 48, in turn, is connected to the secondary winding of a transformer 56 and alternating current is supplied to the transformer 56 through the A. C. lead 58 and through the A. C. lead 60, magnetic circuit breaker and switch 62, and either the low capacity choke 64 or the high capacity series-connected timer 66 and contacts 68 of the relay 50. A fan 70 is connected across the A. C. line and will operate to cool the battery charger.

With this circuit, the magnetic circuit breaker and switch 62 can be moved into position to simultaneously connect the transformer 56 to the A. C. line through the choke 64 and through the timer 66 and the contacts 68 of the relay 50. This permits the energization of the secondary of the transformer 56 and the rectification of current by the rectifier 48. Where the clips 42 and 54 are connected respectively to the negative and positive terminals of a storage battery, the rectifier 48 can effect rapid charging of the battery. The charging action will cause a change in the condition of the electrolyte that will be reflected by a change in the temperature of the electrolyte until, at the moment a good charge is attained, the electrolyte will be at a predetermined temperature, as for example a temperature of approximately one hundred and thirty-five (135) degrees Fahrenheit. At such time, the contactor 23 will warp and deform itself and move into engagement with the contactor 21. Once the contactor 23 has engaged the contactor 21, current from the battery will pass through the circuit which includes the contactors 23 and 21 and the solenoid coil of relay 50, and this current will energize that solenoid coil sufficiently to pull the armature of relay 50 and cause separation of the contacts 68. This will break the high capacity circuit through the timer 66 and contacts 68 and will force the A. C. to pass through the choke 64, which will hold the current to such a small value that continuance of the charging operation cannot hurt or injure the battery. Thereafter, the timer will continue to time the operation until it gives a signal or indication of completion of the operation whereupon the A. C. circuit will be opened completely.

In using the device of the present invention, the caps that normally close the openings in the top of the battery are removed and the sheath 28 is inserted through one of the openings and is pushed into the battery until the bulb 36 rests against that opening. At this time the thermally-responsive tube 10 will be spaced a considerable distance from the opening through which it was inserted and, if the battery has the proper amount of electrolyte, will be immersed in that electrolyte. In the case of the thermostatic capsule shown in Fig. 1, the annular contacts 26 and 30 adjacent that capsule will engage either the electrolyte or the metal of the plates of the storage battery, or both, and will complete the circuit between the conductor 32 and the metal plate 18. However, the contactors 23 and 21 will be spaced apart and will remain in that position until the temperature of the electrolyte in the battery is raised to one hundred and thirty-five (135) degrees Fahrenheit by the charging operation. In the event the electrolyte is below the top of the battery plates, the sheath 28 will rest upon the tops of those plates and contact between the conductor 32 and the metal plate 18 will be completed by the metal of the battery plates. Moreover, whether the sheath 28 is contacted by the electrolyte or is only contacted by the vapor from the electrolyte, the thermally-responsive element 24 will respond directly to the temperature of the electrolyte, and upon the attainment by the electrolyte or its vapor of a temperature of one hundred and thirty-five (135) degrees Fahrenheit, the contactor 23 will be moved into engagement with the contactor 21. Since the material of which the sheath 28 is made is insulating material, heat transmitted to the sheath 28 by the vapor or liquid electrolyte will not be conducted longitudinally through the sheath 28 to the exterior of the battery but instead will pass directly through the sheath 28 and will be absorbed by the thermally-responsive element 24. Moreover, since the sheath 28 is small in diameter and is flexible, the tube 10 can be moved inwardly from the opening of the battery and can be spaced from the atmosphere external of the battery. The fact that the sheath 28 is of insulating material additionally helps keep the temperature of the atmosphere external of the battery from causing a conduction of heat through the sheath 28 that would make the thermally-responsive element 24 responsive to ambient temperatures rather than the temperature of the electrolyte. Moreover, the bulb 36 will tend to prevent free influx and efflux of air into and out of the battery and thus will additionally isolate the thermostatic tube 10 from the ambient temperatures. With the thermostatic device of the present invention, an accurate and close following of the temperature of the electrolyte is obtained and thus it is possible to precisely and accurately determine the precise moment when the electrolyte reaches the desired temperature and to immediately cause cessation of the high capacity charging operation. Such a structure is simple, certain of operation, and obviates the danger of having the control of the charging operation shift from the temperature of the electrolyte to the temperature of the atmosphere surrounding the battery.

Whereas, two preferred embodiments of the present invention have been shown and described in the drawing and accompanying descriptions, it is obvious to those skilled in the art that various changes can be made in the form of the invention without affecting the scope thereof.

What I claim is:

1. A thermostatic device, for use in connection with high capacity battery chargers for storage batteries, that comprises a capsule having a diameter less than the diameter of one of the openings in the top of the battery being charged and having a length less than that of a straight line which extends from the tops of the plates of said battery and passes under one side of said one opening in said battery and passes over the other side of said one opening, relatively movable contacts in said capsule, a thermally-responsive element that is adjacent said contacts and controls the relative positions of said contacts and is adapted to cause relative movement between said contacts, a sheath of resilient, flexible insulating material that is substantially proof against the action of the electrolyte of said battery and encloses said capsule, and has a diameter less than the diameter of the said one opening in the top of said battery, said sheath being insertible into the battery through said one opening to carry said capsule wholly within said battery, and conductors that are carried by said sheath and extend longitudinally of said sheath and that connect said capsule with a high capacity battery charger said capsule and its sheath being dimensioned to lie atop the plates of said battery, said capsule being adapted to be spaced away from said one opening of said battery, while lying atop said battery plates, said thermally-responsive element being responsive to the temperature of the electrolyte within the battery to cause relative movement between said contacts.

2. A thermostatic device, for use in connection with high capacity battery chargers for storage batteries, that comprises a capsule having a diameter less than the diameter of one of the openings in the top of the battery being charged, electrical contacts within said capsule, a thermally-responsive element in said capsule that is adjacent said contacts and controls the relative positions of said contacts and is adapted to cause making and breaking of an electrical circuit through said capsule, a sheath of resilient, flexible insulating material that is resistant to the action of the electrolyte of said battery and encloses said capsule and has a diameter less than the diameter of said one opening in said battery, and conductors that are carried by said sheath and extend longitudinally of said sheath and that connect said capsule and a high capacity battery charger, said sheath having a smoothly rounded end of streamlined form that is adapted to pass over the tops of the plates in the battery, said capsule and its sheath being dimensioned to lie atop the plates of said battery, said thermally-responsive element being responsive to the temperature of the electrolyte within the battery to cause making and breaking of said electrical circuit.

3. A thermostatic device, for use in connection with high capacity battery chargers for storage batteries, that comprises a capsule, relatively movable contacts in said capsule, a thermally-responsive element that is adjacent said contacts and controls the relative positions of said contacts and is adapted to cause relative movement between said contacts, a sheath of resilient, flexible insulating material that is proof against the action of the electrolyte of said battery and that encloses said capsule, and conductors that are carried by said sheath and extend longitudinally of said sheath and that connect said capsule and a high capacity battery charger, said sheath having a diameter less than the diameter of one of the openings in the top of the battery being charged, said sheath having a bulb thereon that is larger than the diameter of said opening said capsule and its sheath being dimensioned to lie atop the plates of said battery, said capsule being adapted to be spaced away from said one opening of said battery, while lying atop said battery plates, said thermally-responsive element being responsive to the temperature of the electrolyte within the battery to cause relative movement between said contacts.

4. A thermostatic device, for use in connection with high capacity battery chargers for storage batteries, that comprises a capsule having a diameter less than the diameter of one of the openings in the top of the battery being charged, relatively movable contacts in said capsule, a thermally-responsive element that is adjacent said contacts and controls the relative positions of said contacts and is adapted to cause relative movement between said contacts, a sheath of resilient, flexible insulating material that is proof against the electrolyte of said battery and encloses said capsule, and conductors that are carried by said sheath and extend longitudinally of said sheath and that connect said capsule and a high capacity battery charger, said sheath having a bulb thereon that is larger than the diameter of said opening, said bulb being adapted to seat in said opening and prevent free influx and efflux of air through said opening said capsule and its sheath being dimensioned to lie atop the plates of said battery, said capsule being adapted to be spaced away from said one opening of said battery, while lying atop said battery plates, said thermally-responsive element being responsive to the temperature of the electrolyte within the battery to cause relative movement between said contacts.

5. A thermostatic device, for use in connection with high capacity battery chargers for storage batteries, that comprises a capsule having a diameter less than the diameter of one of the openings in the top of the battery being charged, relatively movable contacts in said capsule, a thermally-responsive element that is adjacent said contacts and controls the relative positions of said contacts and is adapted to cause relative movement between said contacts, a sheath of resilient, flexible insulating material that is electrolyte-resistant and encloses said capsule, and conductors that are carried by said sheath and extend longitudinally of said sheath and that connect said capsule and a high capacity battery charger, said sheath having a diameter less than the diameter of the said one opening in said battery, the dimensions of said sheath being adapted to cooperate with the flexibility of said sheath to permit insertion of said capsule through said opening of said battery and to permit movement of said capsule away from said opening, said capsule and its sheath being dimensioned to lie atop the plates of said battery, said thermally-responsive element being responsive to the temperature of the electrolyte within the battery to cause relative movement of said contacts.

6. A thermostatic device, for use in connection with high capacity battery chargers for storage batteries, that comprises a capsule having a diameter less than the diameter of one of the openings in the top of the battery being charged, relatively movable contacts in said capsule, a thermally-responsive element that is adjacent said contacts and controls the relative positions of said contacts and is adapted to cause relative movement between said contacts, a sheath of resilient, flexible insulating material that is electrolyte-resistant and encloses said capsule, and conductors that are carried by said sheath and extend longitudinally of said sheath and that connect said capsule and a high capacity battery charger, said sheath having a diameter less than the diameter of said one opening in said battery and being adapted to carry said capsule into said battery and to extend between said capsule and said opening in said battery and thermally isolate said capsule from the atmosphere external of said one opening said capsule and its sheath being dimensioned to lie atop the plates of said battery, said capsule being adapted to be spaced away from said one opening of said battery, while lying atop said battery plates, said thermally-responsive element being responsive to the temperature of the electrolyte within the battery to cause relative movement between said contacts.

7. A thermostatic device, for use in connection with high capacity battery chargers for storage batteries, that comprises a tube of insulating material, a closure for one end of said tube, a cantilever contact support that is secured to said closure and has a contactor thereon, a second closure for the other end of said tube, a thermally-responsive element that has a contactor thereon and is secured to said second closure, said thermally-responsive element being so positioned relative to said contactor of said cantilever contact support as to bring the contactor thereon into register with the contactor of said cantilever contact support and a flexible sheath for said tube, said sheath enclosing said tube, said sheath being insertible within a battery to carry said tube wholly within said battery, said tube and said sheath being adapted to lie atop the plates of said battery while said thermally-responsive element responds to the temperature of the electrolyte within the battery to bring the contactor thereon into register with the contactor of said cantilever contact support.

8. A thermostatic device, for use in connection with high capacity battery chargers for storage batteries, that comprises a thermostatic capsule and a flexible sheath for said capsule, said capsule and sheath being dimensioned to pass through one of the openings of said battery, said sheath flexing to permit such passage said capsule and its sheath being dimensioned to lie atop the plates of said battery.

9. A thermostatic device, for use in connection with high capacity battery chargers for storage batteries, that comprises a tube of insulating material, a closure for one end of said tube, a relatively stationary contactor on a contact support within said tube, the other end of said tube being closed, a thermally-responsive element that has a contactor thereon and is so positioned relative to said contactor of said contact support as to bring its contactor into register with the contactor of said contact support, and a flexible sheath for said tube, said tube and sheath being wholly insertible within a storage battery.

10. A thermostatic device, for use in connection with high capacity battery chargers for storage batteries, that comprises a thermostatic capsule and an electrolyte-resistant resilient sheath for said capsule, said sheath being insertable into one of the openings in the top of the battery to be charged and being bendable during such insertion to carry said capsule wholly within said battery, said capsule and sheath being dimensioned to lie atop the plates of a storage battery.

11. A thermostatic device for use, in connection with high capacity battery chargers for storage batteries, that comprises a thermostatic capsule and a resilient flexible sheath for said capsule, said sheath having a diameter less than the diameter of one of the openings in the top of the storage battery to be charged, said sheath being larger than said capsule and being able to carry said capsule into said battery and to position said capsule at a distance from said one opening, said capsule and sheath being dimensioned to lie atop the plates of a storage battery.

12. A thermostatic device, for use in connection with high capacity battery chargers for storage batteries, that comprises a thermostatic capsule, a flexible sheath for said capsule that is longer than said capsule and can carry said capsule into the battery to be charged, and a bulb secured to and carried by said sheath, said capsule and sheath being dimensioned to lie atop the plates of a storage battery.

13. A thermostatic device, for use in connection with high capacity battery chargers for storage batteries, that comprises a tube of insulating material, a closure for one end of said tube, a relatively stationary contactor on a contact support within said tube, the other end of said tube being closed, a thermally-responsive element that has a contactor thereon and is so positioned relative to said contactor of said contact support as to bring its contactor into register with the contactor of said contact support, a flexible sheath for said tube, and a bulb secured to and carried by said sheath said sheath and tube being insertible in the battery to be charged, said sheath flexing to carry said tube wholly within said battery said tube and sheath being dimensioned to lie atop the plates of said battery.

14. A thermostatic device, for use in connection with high capacity battery chargers for storage batteries, that comprises a fixed contact, a movable contact, thermally-responsive means that moves said movable contact relative to said fixed contact, a sheath of flexible, electrolyte-resistant material that encloses said fixed and movable contacts, said sheath having a diameter smaller than the diameter of openings in a battery, said sheath being long enough to extend through said openings in said battery, and conductors extending between said contacts and a high capacity battery charger said sheath being insertible in a battery to carry said contacts wholly within said battery.

15. A thermostatic device, for use in connection with high capacity battery chargers for storage batteries, that comprises a fixed contact, a movable contact, thermally-responsive means that moves said movable contact relative to said fixed contact, a sheath of flexible, electrolyte-resistant material that encloses said fixed and movable contacts, said conductors extending between said contacts and a high capacity battery charger, said sheath having a diameter less than the diameter of one of the openings in the top of the storage battery to be charged said sheath being dimensioned to lie atop the plates of a storage battery and thereby hold said thermally-responsive means in heat-transferring relation with the electrolyte in said battery.

16. A thermostatic device, for use with high capacity battery chargers, that comprises a capsule having a diameter less than the diameter of one of the openings in the top of the battery to be charged, thermally-responsive means in said capsule that is adapted to respond to changes in the temperature of said capsule and make and break an electrical circuit through said capsule, and a sheath of flexible, electrolyte-resistant, insulating material that encloses said capsule, said sheath having a diameter less than the diameter of said one opening in said battery whereby said sheath can be inserted into said battery and can carry said capsule into said battery, said capsule and sheath being dimensioned to lie atop the plates of a storage battery.

CARL E. PETERS.

REFERENCES CITED

The following references are of record in the file of this patent:

UNITED STATES PATENTS

| Number | Name | Date |
| --- | --- | --- |
| 2,069,054 | Adams | Jan. 26, 1937 |
| 2,288,517 | Dubilier | June 30, 1942 |
| 2,376,056 | Heyer | May 15, 1945 |
| 2,403,803 | Kearsley | July 9, 1946 |
| 2,434,909 | Curtis | Jan. 27, 1948 |
| 2,470,630 | Marcou | May 17, 1949 |